United States Patent
Kurasawa (10) Patent No.: US 7,675,589 B2
(45) Date of Patent: Mar. 9, 2010

(54) LIQUID CRYSTAL DEVICE AND ELECTRONIC APPARATUS

(75) Inventor: Hayato Kurasawa, Matsumoto (JP)

(73) Assignee: Epson Imaging Devices Corporation, Azumino-Shi (JP)

( * ) Notice: Subject to any disclaimer, the term of this patent is extended or adjusted under 35 U.S.C. 154(b) by 299 days.

(21) Appl. No.: 11/496,433

(22) Filed: Aug. 1, 2006

(65) Prior Publication Data

US 2007/0064193 A1     Mar. 22, 2007

(30) Foreign Application Priority Data

Sep. 16, 2005   (JP)   ................ 2005-269658

(51) Int. Cl.
  *G02F 1/1335*   (2006.01)
  *G02F 1/1333*   (2006.01)
(52) U.S. Cl. .................. 349/106; 349/56
(58) Field of Classification Search .......... 349/114, 349/44, 106, 56
  See application file for complete search history.

(56) References Cited

U.S. PATENT DOCUMENTS

| | | | | |
|---|---|---|---|---|
| 6,195,140 | B1 * | 2/2001 | Kubo et al. | 349/44 |
| 6,281,952 | B1 * | 8/2001 | Okamoto et al. | 349/12 |
| 6,912,027 | B2 * | 6/2005 | Kim | 349/114 |
| 7,123,327 | B2 * | 10/2006 | Otake | 349/114 |
| 2001/0024257 | A1 * | 9/2001 | Kubo et al. | 349/138 |
| 2002/0075441 | A1 * | 6/2002 | Fujimori et al. | 349/155 |
| 2003/0076464 | A1 * | 4/2003 | Ozawa et al. | 349/113 |
| 2004/0135945 | A1 * | 7/2004 | Choi et al. | 349/114 |
| 2004/0212765 | A1 * | 10/2004 | Kano et al. | 349/114 |
| 2004/0218122 | A1 * | 11/2004 | Nishimura | 349/114 |
| 2005/0140876 | A1 * | 6/2005 | Kubo | 349/114 |
| 2005/0151897 | A1 * | 7/2005 | Wu et al. | 349/106 |

FOREIGN PATENT DOCUMENTS

| JP | A 2004-325822 | 11/2004 |
|---|---|---|
| JP | A 2004-354507 | 12/2004 |

* cited by examiner

*Primary Examiner*—Frank G Font
*Assistant Examiner*—Robert Tavlykaev
(74) *Attorney, Agent, or Firm*—Oliff & Berridge PLC (57) ABSTRACT

A liquid crystal device includes adjacent sub pixels with adjacent reflection regions and adjacent transmission regions. The device also includes a liquid crystal layer thickness adjusting layer that is continuously formed between two of the sub pixels and provided at least in reflection region. The liquid crystal layer thickness adjusting layer is disposed between the first sub pixel and the second sub pixel having a groove extending from the transmission region and along a boundary between the first and second sub pixels. The color filter for the first sub pixel transmits a color light having the lowest visibility corresponds. Further, a spacer is optionally disposed on an extension line of the groove or at a location adjacent to the groove.

4 Claims, 12 Drawing Sheets

LIQUID CRYSTAL DEVICE AND ELECTRONIC APPARATUS

BACKGROUND

1. Technical Field

The present invention relates to a liquid crystal device and an electronic apparatus.

2. Related Art

Figure 12:
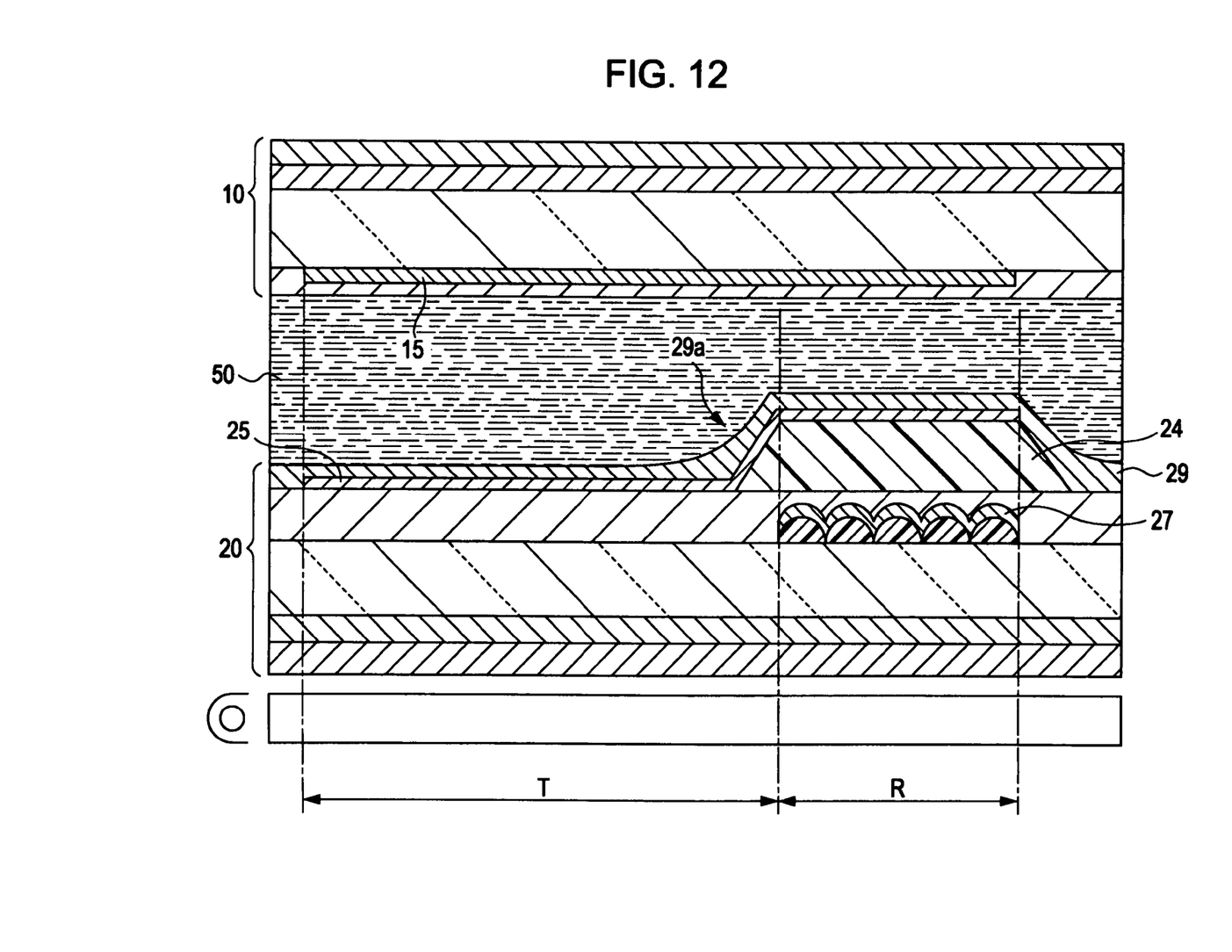
FIG. 12 is a side cross-sectional view of a liquid crystal device according to a related art.

FIG. 12 is a side cross-sectional view of a liquid crystal device according to a related art. As a liquid crystal device having a liquid crystal layer 50 interposed between a viewer side substrate 10 and a light source side substrate 20, a semi-transparent reflective type liquid crystal device having a reflection display mode and a transmission display mode is known. As such a semitransparent reflective type liquid crystal device, a device which includes a reflective layer 27 made of a metal material such as aluminum and provided at the inner side of the light source side substrate is suggested. In the reflection display mode, external light incident from the viewer side substrate 10 is transmitted through the liquid crystal layer 50, reflected from the reflective layer 27 provided on the inner surface of the light source side substrate 20, transmitted through the liquid crystal layer 50 again, and emitted from the viewer side substrate 10, thereby contributing to display. In contrast, in the transmission display mode, the light source light incident from the light source side substrate 20 is transmitted through the liquid crystal layer 50 and emitted from the viewer side substrate 10 to a viewer side, thereby contributing to display. Accordingly, a region in which the reflective layer 27 is formed becomes a reflection region R and a region in which the reflective layer 27 is not formed becomes a transmission region T.

In the semitransparent reflective type liquid crystal device, while the incident light into the transmission region T is transmitted through the liquid crystal layer 50 only once, the incident light into the reflection region R is transmitted through the liquid crystal layer 50 two times. Accordingly, retardation (phase difference) occurs between the transmission region T and the reflection region R. Therefore, in order to reduce the thickness of the liquid crystal layer 50 in the reflection region R to less than that of the liquid crystal layer 50 in the transmission region T, a multi-gap structure in which a liquid crystal layer thickness adjusting layer 24 is formed is employed. By adjusting the retardation by the multi-gap structure, the light transmission becomes uniform in the transmission region T and the reflection region R and thus a liquid crystal device having excellent display quality can be obtained.

In this multi-gap structure, an electrode 25 is formed on the inner surface of the liquid crystal layer thickness adjusting layer 24 and an alignment layer 29 made of polyimide is formed on the inner surface of the electrode 25. The alignment layer 29 is generally formed by a liquid phase process such as a flexographic printing method. However, when the material liquid of the alignment layer 29 is coated on the inner surface of the substrate 20 on which the liquid crystal layer thickness adjusting layer 24 is formed, a liquid pool 29a may occur at any position of the edge (lower corner of the liquid crystal layer thickness adjusting layer 24) of the transmission region T. When the material liquid is dried, the thickness of the alignment layer 29 becomes ununiform and thus irregularities occur.

In the paragraph 0016 of JP-A-2004-325822, there is disclosed "Since a recessed part where a projecting insulating film is not formed is continuously formed between adjacent pixels, an alignment layer may be moved along the recessed part between the adjacent pixels when the alignment layer is formed to cover the projecting insulating film and the recessed part. Accordingly, since a material of the alignment layer can be suppressed from being pooled only in the recessed part of some pixel, the alignment layer formed in the recessed part becomes uniform in a plurality of pixels and thus the thickness of the alignment layer can be substantially uniform in the respective pixels. As a result, it is possible to suppress display quality from deteriorating due to ununiformity in the thickness of the alignment layer formed in the recessed part".

However, disturbance in the alignment of liquid crystal molecules occurs in the vicinity of the recessed part. When the disturbance in the alignment extends to the inside the pixel, light leakage occurs in black display. When the recessed part is formed between all the adjacent pixels, a display property seriously deteriorates.

SUMMARY

An advantage of the invention is to provide a liquid crystal device capable of suppressing a liquid pool of an alignment layer and ensuring display quality.

Another advantage of the invention to provide an electronic apparatus having excellent display quality.

According to an aspect of the invention, there is provided a liquid crystal device including: a pair of substrates which individually include a transmission region and a reflection region in a sub pixel region which is an image display unit and face each other with a liquid crystal layer interposed therebetween; a spacer which holds a gap between the pair of substrates; a reflective layer which is provided on one of the pair of substrates and reflects light incident from the other of the pair of substrates; a liquid crystal layer thickness adjusting layer which reduces the thickness of the liquid crystal layer in the reflection region to less than that of the liquid crystal layer in the transmission region; and color filters which display a plurality of different colors in adjacent sub pixel regions, wherein, among the plurality of different colors, a first color filter which transmits first color light having lowest visibility is disposed in a predetermined sub pixel region and a second color filter which transmits second color light different from the first color light is a sub pixel region adjacent to the predetermined sub pixel region, and wherein a groove is formed in the liquid crystal layer thickness adjusting layer of at least a portion between the first color filter and the second color filter, from a region in which the thickness of the liquid crystal layer is large to a region in which the thickness of the liquid crystal layer is small, and a spacer is disposed adjacent to the groove.

It is preferable that the bottom of the groove is disposed at a height which is substantially equal to that of the surface of the region, in which the thickness of the liquid crystal layer is large, of the substrate having the liquid crystal layer thickness adjusting layer thereon, among the pair of substrates.

By this configuration, since the groove is formed in the liquid crystal layer thickness adjusting layer from the first region in which the thickness of the liquid crystal layer is large to the second region in which the thickness of the liquid crystal layer is small, it is possible to allow the material liquid of the alignment layer coated on the transmission region to escape into the groove. Accordingly, it is possible to suppress the liquid pool of the alignment layer in the edge of the transmission region. Since the groove is formed between the first color filter which transmits the first color light having lowest visibility and the second color filter and the spacer is disposed adjacent to the groove, although disturbance in the arrangement of liquid crystal molecules occurs in the vicinities of the groove and the spacer, it is possible to minimize the influence of the light leakage due to the disturbance in the alignment. Accordingly, it is possible to suppress the liquid pool of the alignment layer and to ensure the display quality.

It is preferable that the groove is formed in the portion between the first color filter and the second color filter, from the region in which the thickness of the liquid crystal layer is large to the region in which the thickness of the liquid crystal layer is small, and the spacer is disposed on an extension line of the groove.

It is preferable that the liquid crystal layer thickness adjusting layer is continuously formed in adjacent two sub pixel regions in which the color filters having a same color are disposed, a pair of grooves is formed from each of the two sub pixel regions in the portion between the first color filter and the second color filter, from the region in which the thickness of the liquid crystal layer is large to the region in which the thickness of the liquid crystal layer is small, and the spacer is disposed on an extension line of the pair of grooves.

By these configurations, the groove and the spacer can be disposed between the sub pixel region in which the first color filter is formed and the sub pixel region in the second color filter is formed. Accordingly, it is possible to reduce possibility that the disturbance in the alignment which occurs in vicinities of the groove and the spacer extends to the central portion of the sub pixel region and to minimize influence of light leakage due to the disturbance in the alignment.

It is preferable that the liquid crystal layer thickness adjusting layer is continuously formed in adjacent two sub pixel regions in which the color filters having a same color are disposed, the groove is formed such that the two sub pixel regions are communicated with each other between the first color filter and the second color filter, from the region in which the thickness of the liquid crystal layer is large to the region in which the thickness of the liquid crystal layer is small, and the spacer is disposed adjacent to the groove.

It is preferable that the liquid crystal layer thickness adjusting layer is continuously formed in adjacent two sub pixel regions in which the color filters having a same color are disposed, the groove is formed such that the two sub pixel regions are communicated with each other between the first color filter and the second color filter, from the region in which the thickness of the liquid crystal layer is large to the region in which the thickness of the liquid crystal layer is small, and the spacer is disposed adjacent to the groove in a region in which the first color filter is formed.

By these configurations, the adjacent two sub pixel region in which the color filters having the same color are disposed are communicated with each other by the groove, the coated amount of the material liquid of the alignment layer can become uniform in each sub pixel region. Accordingly, it is possible to suppress the liquid pool of the alignment layer in the edge of the transmission region.

According to another aspect of the invention, there is provided an electronic apparatus including the liquid crystal device according to the above-described liquid crystal device.

By this configuration, since the liquid crystal device capable of suppressing the liquid pool of the alignment layer and ensuring display quality is included, it is possible to provide an electronic apparatus having excellent display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. In each view used for following description, the scale of each element is properly modified such that each element has a size capable of being identified in the view.

In the present specification, in each element of a liquid crystal device, a liquid crystal layer side is referred to as an inner side and the opposite side thereof is referred to as an outer side. A region which is a minimum unit of image display is referred to as a "sub pixel region" and a set of sub pixel regions each having a color filter is referred to as a "pixel region". "When applying a non-selection voltage" and "when applying a selection voltage" are "when a voltage applied to a liquid crystal layer is close to a threshold value of liquid crystal" and "when the voltage applied to the liquid crystal layer is sufficiently higher than the threshold value of the liquid crystal", respectively.

First Embodiment

First, a liquid crystal device according to a first embodiment of the invention will be described with reference to FIGS. 1 to 5. The liquid crystal device according to the first embodiment is an active matrix type liquid crystal device using a thin film transistor (hereinafter, referred to as "TFT") element as a switching element. The liquid crystal device according to the first embodiment is a semitransparent reflective type liquid crystal device using negative type liquid crystal having negative dielectric anisotropy.

Figure 1A:
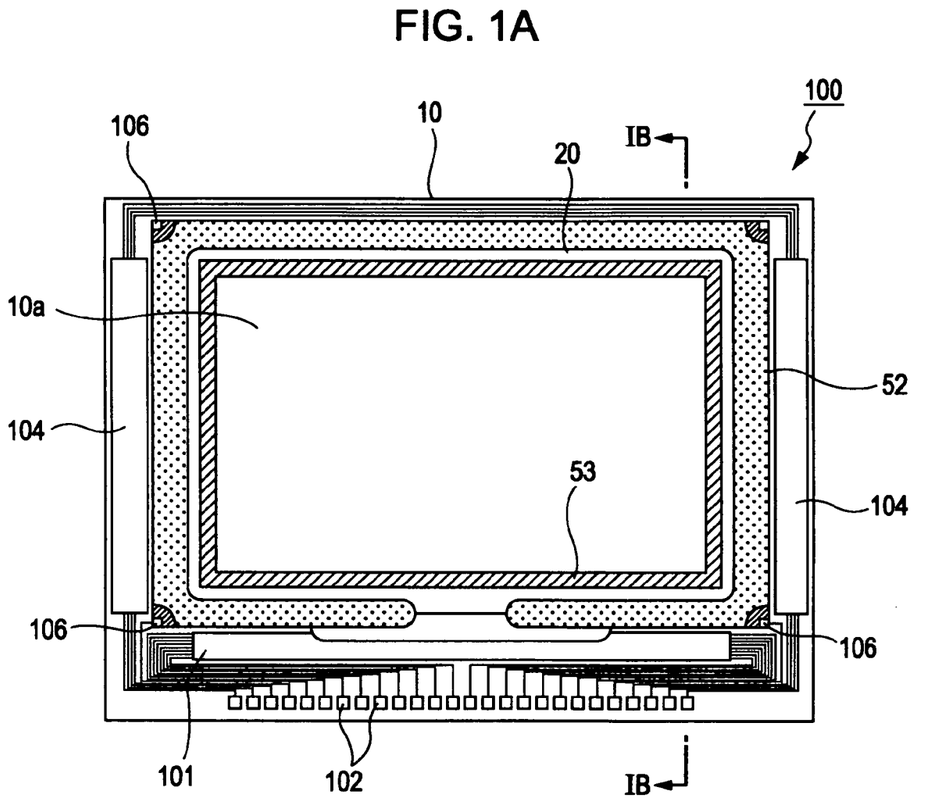
FIGS. 1A and 1B are a plan view and a side cross-sectional view of a liquid crystal device, respectively.
Figure 1B:
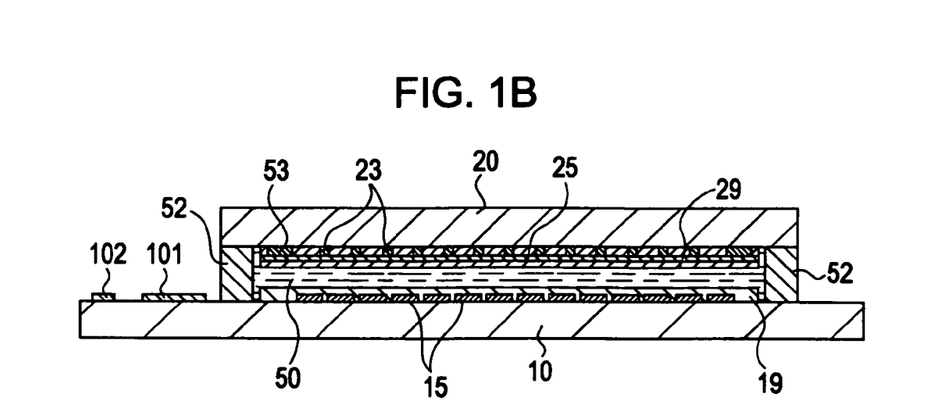

FIG. 1A is a plan view showing the liquid crystal device according to the present embodiment together with each element when viewed from a color filter substrate and FIG. 1B is a side cross-sectional view taken along line IB-IB, of FIG. 1A.

As shown in FIG. 1, in the liquid crystal device 100 according to the present embodiment, a TFT-arrayed substrate (hereinafter, referred to as an "element substrate") 10 and a color filter substrate (hereinafter, referred to as a "CF substrate") are attached to each other by a seal material 52, and a liquid crystal layer 50 is filled in a region defined by the seal material 52. In a peripheral circuit region which is outside the seal material 52, a data line driving circuit 101 and an external circuit mounting terminal 102 are formed along one side of the element substrate and scan line driving circuits 104 are formed along two sides adjacent to the one side. Inter-substrate conductor 106, for electrically conduction between the element substrate 10 and the CF substrate 20, are formed at the corners of the CF substrate 20.

Equivalent Circuit

Figure 2:
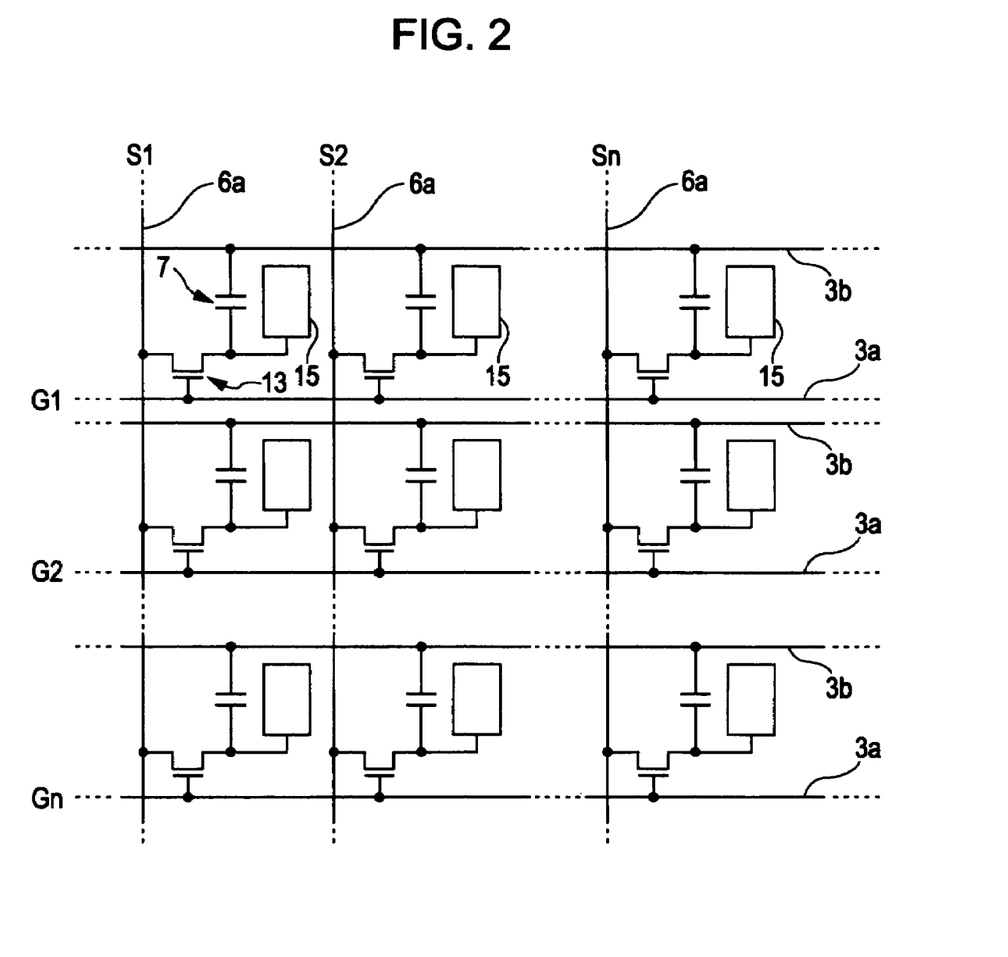
FIG. 2 is an equivalent circuit diagram of the liquid crystal device using a TFT element.

FIG. 2 is an equivalent circuit diagram of the liquid crystal device using the TFT element. In an image display region of the liquid crystal device, data lines 6a and gate lines 3a are arranged in a lattice shape and dots which each is an image display unit are arranged at the intersections therebetween. In the plurality of dots arranged in a matrix, pixel electrodes 15 are formed. TFT elements 13 which are switching elements for controlling conduction of the pixel electrodes 15 are formed adjacent to the pixel electrodes 15. The sources of TFT elements 13 are electrically connected to the data lines 6a. Image signals S1, S2, . . . , and Sn are applied to the data lines 6a.

The gates of the TFT elements 13 are electrically connected to the gate lines (scan lines) 3a. Scan signals G1, G2, . . . , and Gn are applied in pulse at given timing. The pixel electrodes 15 are electrically connected to the drains of the TFT elements 13. When the TFT elements 13 which are the switching elements are turned on only for a predetermined period by the scan lines G1, G2, . . . , and Gn supplied from the gate lines 3a, the image signals S1, S2, . . . , and Sn supplied from the data lines 6a are written to the liquid crystal of the respective pixels at given timing.

The image signals S1, S2, . . . , and Sn each having a predetermined level, which are written to the liquid crystal, are retained by liquid crystal capacitors formed between the pixel electrodes 15 and the below-described common electrode for a predetermined period. In order to prevent the retained image signals S1, S2, . . . , and Sn from leaking, storage capacitors 7 can be provided in parallel to the liquid crystal capacitors between the pixel electrodes 15 and capacitance lines 3b. When a voltage signal is applied to the liquid crystal as described above, orientation of liquid crystal molecules varies depending on the voltage level applied thereto. Accordingly, light incident to the liquid crystal is modulated and gradation display is possible.

Plane Structure and Cross-Sectional Structure

Figure 3:
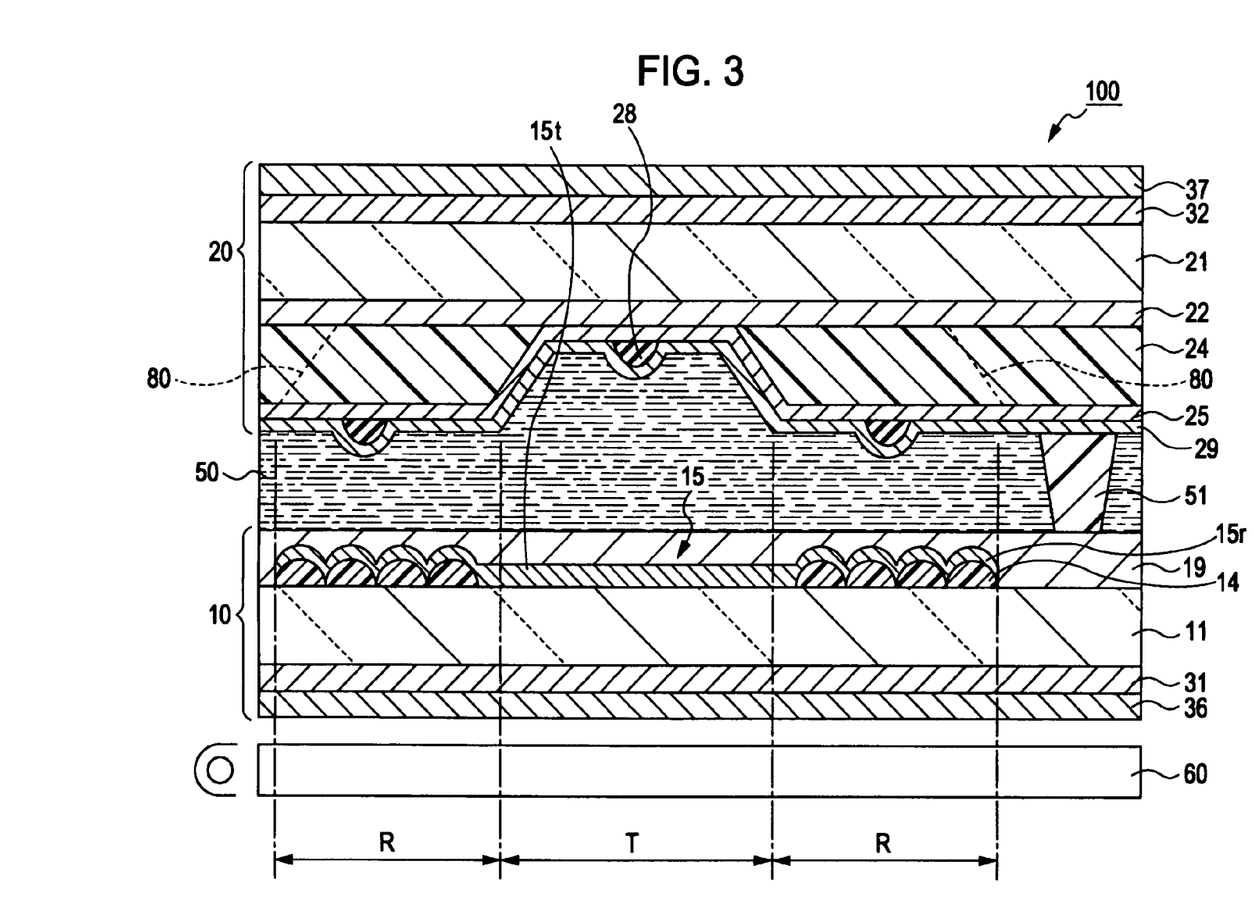
FIG. 3 is a side cross-sectional view of a sub pixel region taken along line III-III of FIG. 4.
Figure 4:
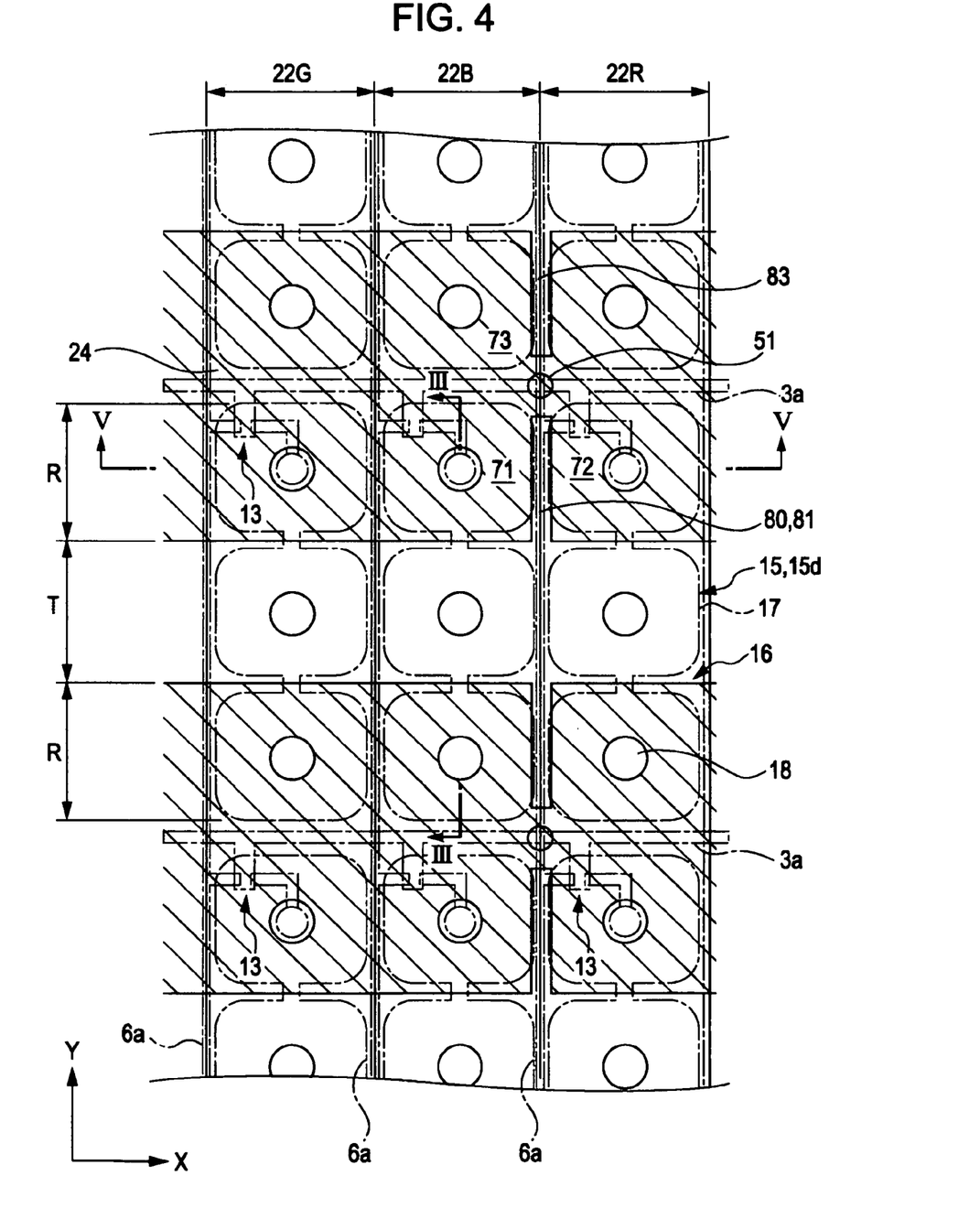
FIG. 4 is a plan view of a CF substrate.

FIG. 3 is a side cross-sectional view of the sub pixel region taken along line III-III of FIG. 4. In FIG. 3, for facilitating understanding, the TFT elements and various kinds of wirings on the element substrate 10 will be omitted. The liquid crystal device 100 according to the present embodiment includes the element substrate 10 disposed at a light source side, the CF substrate 20 disposed at a viewer side, and the liquid crystal layer 50 interposed between the substrates 10 and 20. Alternatively, the element substrate 10 may be disposed at the viewer side and the CF substrate 20 may be disposed at the light source side.

As shown in FIG. 3, in the inner side of the substrate body 11 of the element substrate 10, a resin layer 14 having irregularities thereon is formed at the both ends of a longitudinal direction of the sub pixel region. A reflective electrode (reflective film) 15r made of a metal material having high reflectivity, such as aluminum, is formed on the surface of the resin layer 14. A transparent electrode 15t made of a transparent conductive material such as indium tin oxide (ITO) is formed at the central portion of the longitudinal direction of the sub pixel region. The reflective electrode 15r and the transparent electrode 15t are electrically connected to each other to form the pixel electrode 15. A region in which the reflective electrode 15r is formed becomes a reflection region R and a region in which the reflective electrode 15r is not formed becomes a transmission region T. That is, in the sub pixel region having a substantially rectangular shape, the reflection region R is provided at the both ends of the longitudinal direction and the transmission region T is provided at the central portion of the longitudinal direction. The alignment layer 19 is formed on the surface of the pixel electrode 15.

FIG. 4 is a plan view of the CF substrate when viewed from the inner side. In FIG. 4, the pixel electrode 15 formed on the element substrate is denoted by a dashed line. A plurality of notches 16 which extends from one long side to the other long side (central portion) is formed in the pixel electrode 15 to form pairs in the respective long sides. Accordingly, one pixel electrode 15 is divided into a plurality (three in FIG. 4) of sub dots 17 in the longitudinal direction and each sub dot 17 has a substantially circular shape or a substantially polygonal shape. The sub dots 17 are electrically connected to each other at the central portion in a width direction.

Returning to FIG. 3, a color filter layer (hereinafter, referred to as a "CF layer") 22 is formed at the inner side of a substrate body 21 of the CF substrate 20. As shown in FIG. 4, a plurality of color filters (coloring material layers) 22G, 22B and 22R which transmit different color lights (for example, any one of three primary colors of RGB) is arranged in the CF layer 22. Each color filter is arranged in correspondence with the position of each pixel electrode 15. For example, each color filter has a width slightly greater than that of each pixel electrode 15 and the color filters having same color light are consecutively formed in the longitudinal direction of the pixel electrode 15.

It is preferable that the color filters are divided into two regions having different chromaticity in the sub pixel region. For example, a first coloring material region is provided in correspondence with a planar region of the transmission region T, a second coloring material region is provided in correspondence with a planar region of the reflection region R, and the chromaticity of the first coloring material region is larger than that of the second coloring material region. A non-coloring region may be provided at a portion of the reflection region R. By this configuration, it is possible to prevent the chromaticity of the display light from varying between the transmission region T in which the display light is transmitted through the color filter only once and the reflection region R in which the display light is transmitted through the color filter two times and to improve visible quality in the reflection display and the transmission display and display quality.

Returning to FIG. 3, a liquid crystal layer thickness adjusting layer 24 for reducing the thickness of the liquid crystal layer 50 in the reflection region R to less than that of the liquid crystal layer 50 in the transmission region T is provided at the inner side of the CF layer 22. In the semitransparent reflective type liquid crystal device, while light incident to the reflection region R is transmitted through the liquid crystal layer 50 two times, light incident to the transmission region T is transmitted through the liquid crystal layer 50 only once. Accordingly, since the reflection region R and the transmission region T are different from each other in polarization modulation effect of the liquid crystal layer 50, the transmission region T and the reflection region R are different from each other in a gradation display property. Accordingly, by providing the liquid crystal layer thickness adjusting layer 24, the multi-gap structure is realized. More specifically, the thickness of the liquid crystal layer 50 in the reflection region R is set to about a half of the thickness of the liquid crystal layer 50 in the transmission region T, and the reflection region R and the transmission region T are substantially equal to each other in retardation of the liquid crystal layer 50. Accordingly, it is possible to obtain uniform image display in the reflection region R and the transmission region T. Hereinafter, a region in which the thickness of the liquid crystal layer is large in the transmission region T and the vicinity thereof is referred to as a first region and a region in which the thickness of the liquid crystal layer is small in the reflection region R and the vicinity thereof is referred to as a second region.

It is preferable that the liquid crystal layer thickness adjusting layer 24 is made of a material having an electric insulation property and photosensitivity, such as acrylic resin. By employing the photosensitive material, it is possible to pattern the liquid crystal layer thickness adjusting layer using photolithography with high precision. The liquid crystal layer thickness adjusting layer 24 may be provided on the element substrate 10 or both the element substrate 10 and the CF substrate 20.

A common electrode 25 is formed over entire surface at the inner side of the CF substrate 20 on which the liquid crystal layer thickness adjusting layer 24 is formed. A protrusion 28 made of an electric insulating material such as resin is formed on the surface of the common electrode 25. An alignment layer 29 made of polyimide is formed on the surface of the common electrode 25 and the protrusion 28. The alignment layer 29 is formed by drying a soluble polyimide solution, which is, for example, coated by a flexographic printing method, at 180° C. or less.

In order to restrict the thickness (cell gap) of the liquid crystal layer 50, a photo spacer 51 is formed. The photo spacer 51 is erected on the surface of the liquid crystal layer thickness adjusting layer 24 of the CF substrate 20 such that the front end thereof is in contact with the element substrate 10. Alternatively, the photo spacer 51 may be erected on the element substrate 10 such that the front end thereof is in contact with the CF substrate 20. Even in any case, since the photo spacer 51 is formed in the reflection region R in which the thickness of the liquid crystal layer is reduced by the liquid crystal layer thickness adjusting layer 24, it is possible to reduce an aspect ratio of the photo spacer 51. The photo spacer 51 is made of a photosensitive material such as acrylic resin and is formed using the photolithography.

The liquid crystal layer 50 made of the negative type liquid crystal material having the negative dielectric anisotropy is interposed between the element substrate 10 and the CF substrate 20. This liquid crystal material is aligned perpendicular to the alignment layer when applying the non-selection voltage and is aligned in parallel to the alignment layer (that is, perpendicular to an electric field direction) when applying the selection voltage.

As shown in FIG. 4, the notch 16 and the plurality of sub dots 17 are formed in each pixel electrode 15. The protrusion 28 is formed on the common electrode in correspondence with the center of the sub dot 17. When the selection voltage is applied across the pixel electrode 15 and the common electrode, an oblique electric field occurs in the vicinity of the notch 16 and the protrusion 28. Accordingly, the liquid crystal molecules which were vertically aligned when applying the non-selection voltage are realigned from the central portion of the sub dot 17 in a radial direction. That is, the notch 16 and the protrusion 28 function as an alignment control unit. Accordingly, the direction of a director of the liquid crystal molecules simultaneously occurs in plural and thus a liquid crystal device having a wide viewing angle can be provided. As the alignment control unit, an opening (slit) may be formed in the common electrode, instead of the protrusion 28.

Returning to FIG. 3, a phase difference plate 31 and a polarization plate 36 are provided on the outer surface of the element substrate 10, and a phase difference plate 32 and a polarization plate 37 are provided on the outer surface of the CF substrate 20. The polarization plates 36 and 37 transmit only linearly polarized light which oscillates in a specific direction and are provided such that the transmission axis of the polarization plate 36 is substantially perpendicular to that of the polarization plate 37. A λ/4 plate having a phase difference of a substantially ¼ wavelength with respect to the wavelength of visible light is employed in the phase difference plates 31 and 32. A circularly polarized plate for converting linearly polarized light into circularly polarized light and converting the circularly polarized light into the linearly polarized light is configured by combination of the polarization plate 36 and the phase difference plate 31 and combination of the polarization plate 37 and the phase difference plate 32.

A backlight (illumination unit) 60 such as a light source, a reflector, a light guide plate is outside the liquid crystal cell corresponding to the outer surface of the CF substrate 20.

In the liquid crystal device according to the present embodiment, black display is performed when applying the non-selection voltage and white display is performed when applying the selection voltage (normally black mode). By adjusting the voltage applied to the liquid crystal layer 50, it is possible to perform the gradation display.

Groove

In the above-described liquid crystal device, as shown in FIG. 4, the plurality of color filters 22R, 22G and 22B, which transmit the three primary colors of RGB, respectively, is formed. That is, a first color filter 22B which transmits blue light, a second color filter 22R which transmits red light and a third color filter 22G which transmits green light are arranged in that order. Here, a direction in which the filters having a same color are arranged is referred to as a Y direction (first direction) and a direction in which the filters having different colors are sequentially arranged is referred to as an X direction (second direction). A light shielding layer may be formed in the boundary between different color filters.

In the above-described liquid crystal device, the liquid crystal layer thickness adjusting layer 24 is provided in correspondence with the reflection region R and the liquid crystal layer thickness adjusting layer 24 is continuously formed to cross the plurality of sub pixel regions 15d in the X direction. A groove 80 is formed in the liquid crystal layer thickness adjusting layer 24 in the boundary between a first sub pixel region 71 in which the first color filter 22B is formed and a second sub pixel region 72 in which the second color filter 22R is formed. Here, a region in which the thickness of the liquid crystal layer is large (that is, the transmission region T and a region adjacent to the transmission region T in the X direction) is referred to a first region and a region in which the thickness of the liquid crystal layer is small (that is, the reflection region R and a region adjacent to the reflection region R in the X direction) is referred to as a second region. The groove 80 is formed from the first region to the second region.

Figure 5:
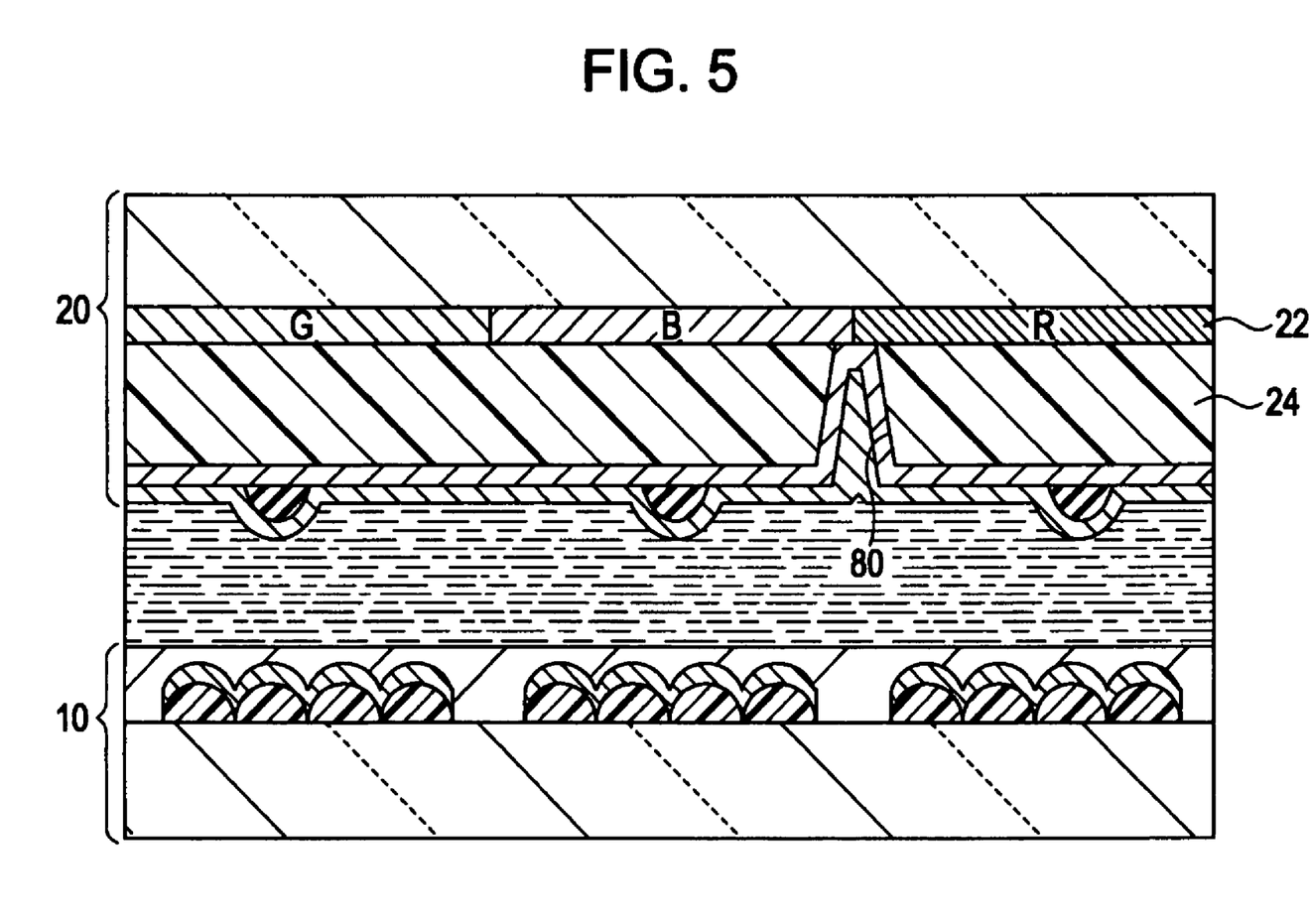
FIG. 5 is a front cross-sectional view taken along line V-V of FIG. 4.

FIG. 5 is a front cross-sectional view taken along line V-V of FIG. 4. The groove 80 shown in FIG. 5 is formed to penetrate through the liquid crystal layer thickness adjusting layer 24 in the thickness direction. That is, the bottom of the groove 80 is disposed at a height which is substantially equal to that of the surface of the first region of the CF substrate 20 having the liquid crystal layer thickness adjusting layer 24 thereon. The groove 80 may be shallowly formed such that the liquid layer thickness adjusting layer 24 remains at the bottom of the groove 80.

As shown in FIG. 3, the alignment layer 29 is formed at the inner side of the CF substrate 20 by a liquid phase process such as a flexographic printing method. When the material liquid of the alignment layer 29 is coated on the inner surface of the CF substrate 20 on which the liquid crystal layer thickness adjusting layer 24 is formed, a liquid pool may occur in the edge of the transmission region T (lower corner of the liquid crystal layer thickness adjusting layer 24) by leveling effect. When the material liquid is dried, the thickness of the alignment layer 29 is ununiform and thus irregularities occur.

In contrast, in the present embodiment, since the groove 80 is formed in the liquid crystal layer thickness adjusting layer 24 from the first region in which the thickness of the liquid crystal layer is large to the second region in which the thickness of the liquid crystal layer is small, it is possible to allow the material liquid of the alignment layer 29 coated on the transmission region T to escape into the groove. Accordingly, it is possible to suppress the liquid pool of the alignment layer 29 in the edge of the transmission region T.

As shown in FIG. 4, the reflection region R is provided at the end of the ±Y direction of each sub pixel region 15d and the liquid crystal layer thickness adjusting layer 24 is provided in correspondence with the reflection region R. In the first sub pixel region 71 and the third sub pixel region 73 which are close to each other in the Y direction, the liquid crystal layer thickness adjusting layer 24 of +Y side in the first sub pixel region 71 of the −Y side and the liquid crystal layer thickness adjusting layer 24 of −Y side in the third sub pixel region 73 of the +Y side are integrally and continuously formed. A pair of grooves 81 and 83 is formed in a portion between the first color filter and the second color filter from each of a pair of first regions disposed at the both sides of the Y direction across the liquid crystal layer thickness adjusting layer 24 to a portion of the second region. The pair of grooves 81 and 83 is formed from each of the pair of first regions to the gate line 3a disposed in the boundary between the first sub pixel region 71 and the third sub pixel region 73, without crossing the liquid crystal layer thickness adjusting layer 24 in the Y direction. The above-described photo spacer 51 is formed on the surface of the liquid crystal layer thickness adjusting layer 24 between the grooves 81 and 83.

However, disturbance in the alignment of liquid crystal molecules occurs in the vicinity of the photo spacer 51. When the disturbance in the alignment extends to the central portion of the sub pixel region, light leakage occurs in the black display. In contrast, in the present embodiment, the photo spacer 51 can be disposed between the first sub pixel region 71 and the second sub pixel region 72 in the boundary between the first color filter 22B and the second color filter 22R. That is, it is possible to dispose the photo spacer 51 at a position farthest from the central portion of the sub pixel region. Accordingly, it is possible to reduce possibility that the disturbance in the alignment which occurs in vicinities of the groove and the spacer extends to the central portion of the sub pixel region and to minimize influence of light leakage due to the disturbance in the alignment. Since the photo spacer 51 can be disposed without forming the notch in the pixel electrode, it is possible to ensure an aperture ratio. In addition, when the liquid crystal layer thickness adjusting layer 24 exists in the substantially entire circumference of the photo spacer 51, it is possible to form the photo spacer 51 in a stable state.

However, the disturbance in the alignment of the liquid crystal molecules occurs in the vicinity of the groove 80 as well as the vicinity of the photo spacer 51. When the disturbance in the alignment extends to the central portion of the sub pixel region, light leakage occurs in the black display. To this end, when the groove 80 and the photo spacer 51 are formed among all the sub pixel regions, a display property such as contrast seriously deteriorates.

Accordingly, the groove 80 and the photo spacer 51 are formed only in the boundary between the color filters which transmit color light having lowest visibility. The human eye perceives brightness (visibility) which varies depending on the wavelength of light. Among the three primary color lights of RGB, the visibility of the green light is highest and the visibility of the blue light is lowest. Accordingly, the groove 80 and the photo spacer 51 are formed only in the boundary between the first color filters 22B which transmit the blue light. It is preferable that the groove 80 and the photo spacer 51 are not formed in the boundary between the third color filters 22G which transmit the green light. Accordingly, the groove 80 and the photo spacer 51 are formed in the boundary between the first color filter 22B which transmit the blue light and the second color filter 22R which transmits the red light. Therefore, although the disturbance in the alignment occurs in the vicinities of the groove 80 and the photo spacer 51, since the green light having high visibility does not leak and the blue light having low visibility leaks, it is possible to minimize influence of the light leakage. When the light shielding layer is formed in the boundary between the color filters which transmit different color lights, it is possible to more suppress the influence of the light leakage.

As described above, according to the liquid crystal device according to the present embodiment, since the liquid pool of the alignment layer can be suppressed, the thickness of the alignment layer can become uniform and irregularities are prevented from occurring. Since it is possible to minimize the influence of the light leakage due to the disturbance in the alignment which occurs in the groove 80 and the photo spacer 51, it is possible to ensure display quality. Accordingly, it is possible to prevent the liquid pool of the alignment layer from occurring and to ensure the display quality.

Second Embodiment

Next, a liquid crystal device according to a second embodiment of the present invention will be described with reference to FIGS. 6 to 10. The liquid crystal device according to the second embodiment is an active matrix type liquid crystal device using a thin film diode (hereinafter, referred to as "TFD") as a switching element. The liquid crystal device according to the second embodiment is a semitransparent reflective type liquid crystal device using positive liquid crystal having positive dielectric anisotropy. The same elements as the first embodiment are denoted by the same reference numerals and thus their detailed description will be omitted.

Equivalent Circuit

Figure 6:
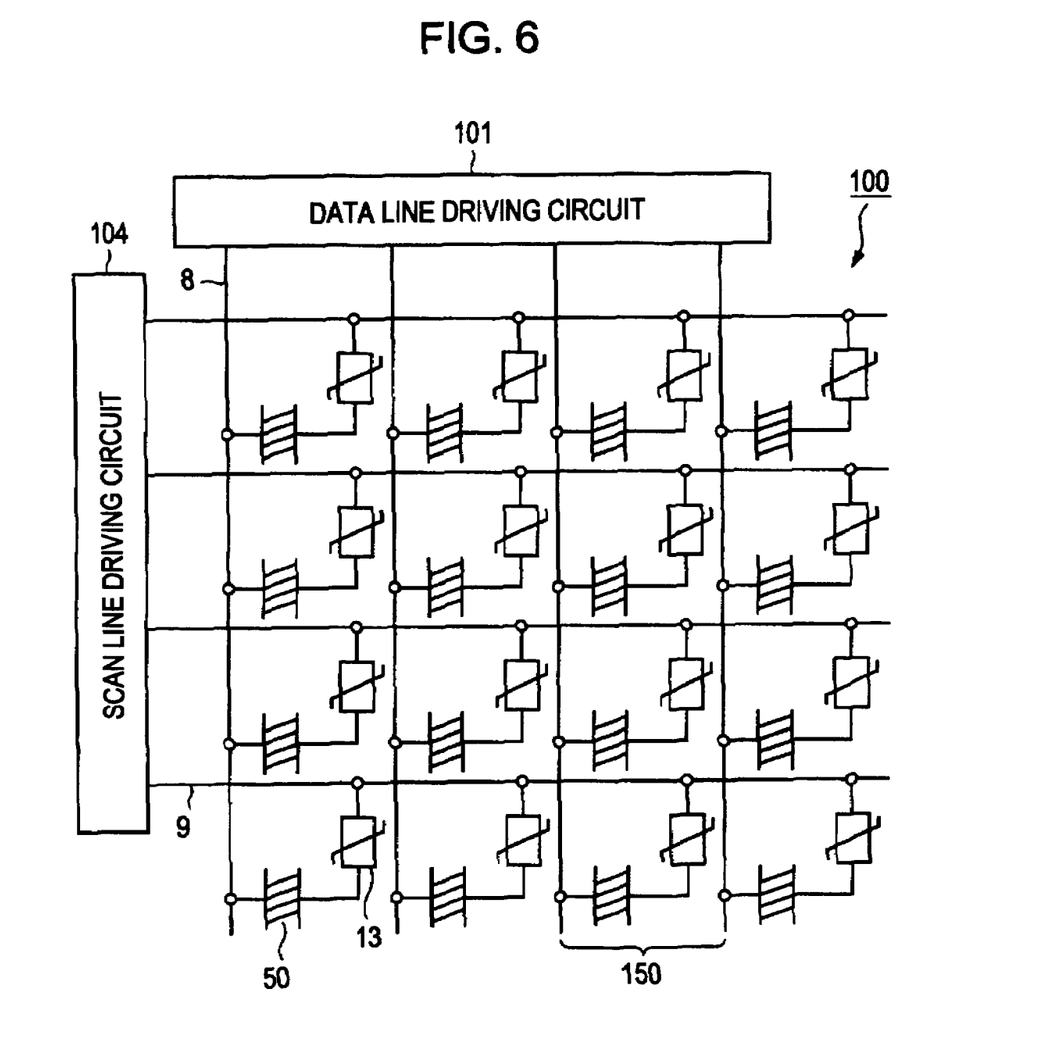
FIG. 6 is an equivalent circuit diagram of a liquid crystal device using a TFD element.

FIG. 6 is an equivalent circuit diagram of the liquid crystal device according to the second embodiment. In the liquid crystal device 100, a plurality of scan lines 9 which is driven by a scan signal driving circuit 104, a plurality of data lines 8 which is driven by a data signal driving signal 101 are arranged in a lattice shape. TFD elements 13 and liquid crystal display elements (liquid crystal layers) 50 are arranged in the vicinities of the intersections between the scan lines 9 and the data lines 8. The TFD elements 13 and the liquid crystal layers 50 are connected to each other between the scan lines 9 and the data liens 8 in series.

Plane Structure

Figure 7:
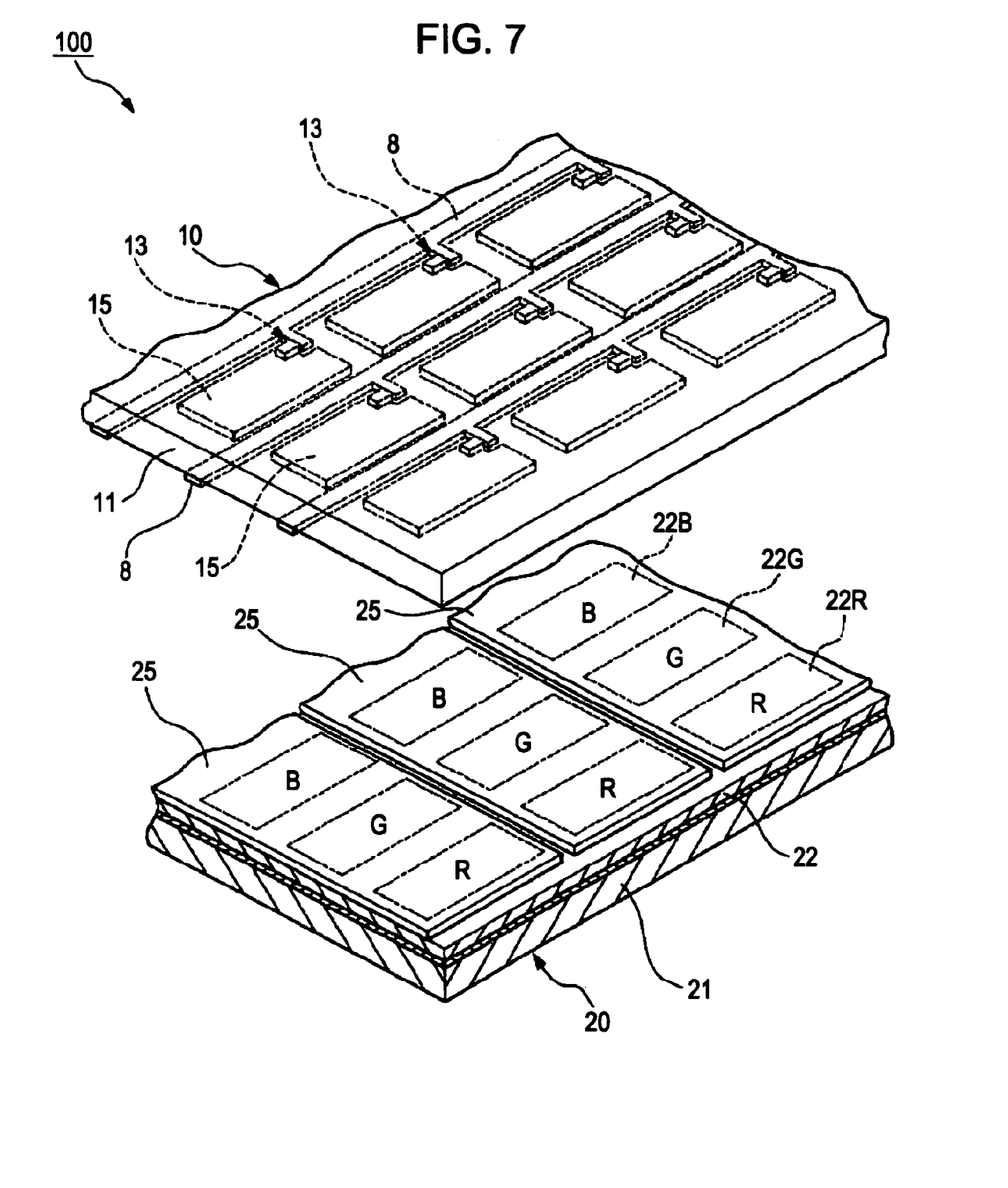
FIG. 7 is a partial perspective view of a display region of the liquid crystal device using the TFD element.

FIG. 7 is a partial perspective view of a display region of the liquid crystal device according to the second embodiment. The liquid crystal device 100 according to the present embodiment includes an element substrate 10 disposed at a viewer side, a CF substrate 20 disposed at a light source side, and a liquid crystal layer interposed between the substrates 10 and 20. Alternatively, the CF substrate 20 may be disposed at the viewer side and the element substrate 10 may be disposed at the light source side.

The element substrate 10 includes a substrate body 11 made of a light transmission material such as glass, plastic or quartz. The plurality of data lines 8 is provided at the inner side (lower side in Figure) of the substrate body 11 in a stripe shape. A plurality of pixel electrodes 15 made of a transparent conductive material such as ITO and having a substantially rectangular shape when viewed in a plan view is formed in a matrix. The pixel electrodes 15 are connected to the data lines 8 through the TFD elements 13.

Meanwhile, a CF layer 22 having a plurality of color filters 22B, 22G and 22R which transmit different color lights is formed at the inner side of the substrate body 21 of the CF substrate 20. Belt-like opposite electrodes 25 are formed to cover the CF layer 22. The opposite electrodes 25 function as the above-described scan lines and extend in a direction perpendicular to the data lines 8 of the element substrate 10. Alternatively, the opposite electrodes 25 of the CF substrate 20 may function as the data lines 25 and the data lines 8 of the element substrate 10 may function as the scan lines.

Cross-Sectional Structure

Figure 8:
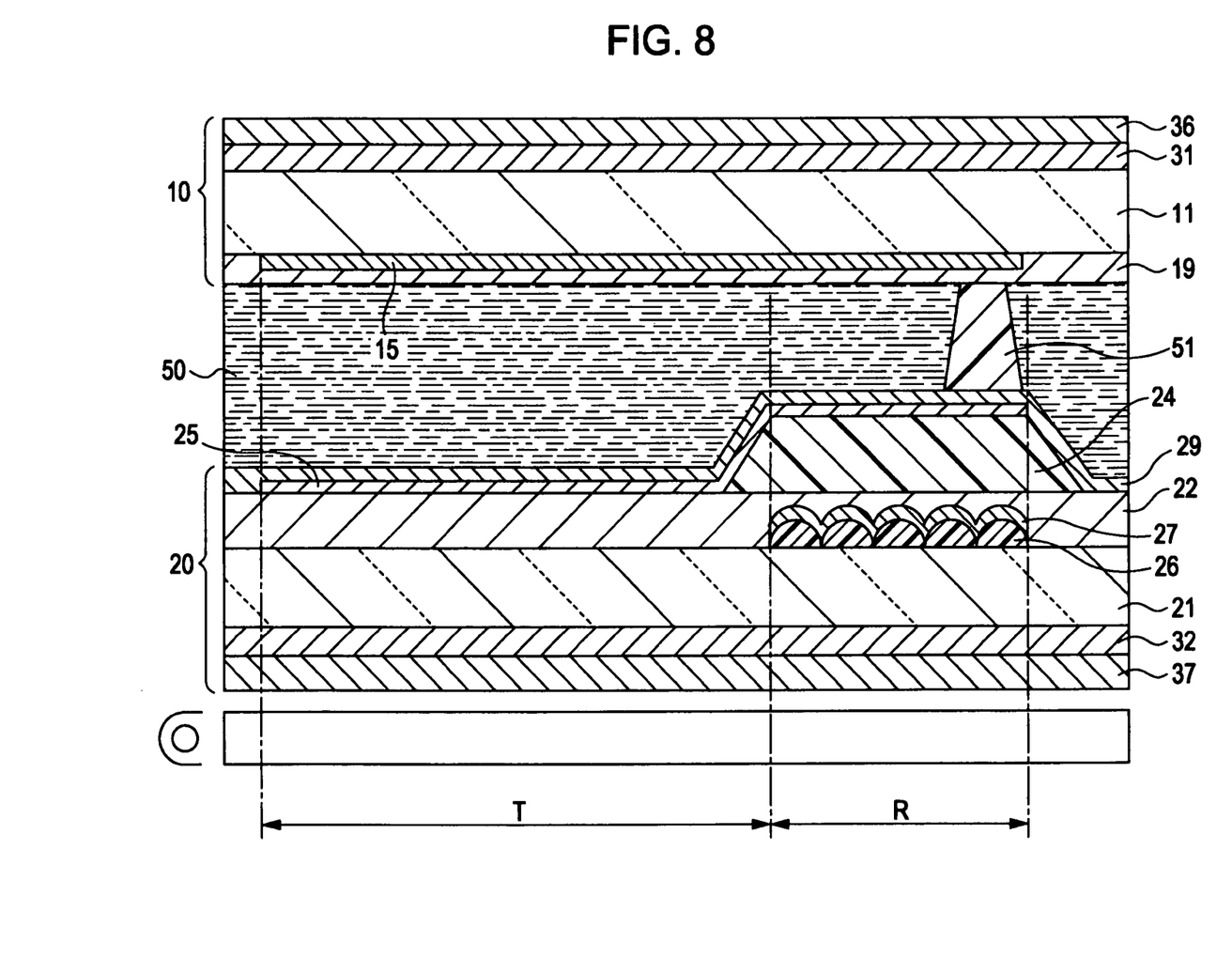
FIG. 8 is a side cross-sectional view of a sub pixel region taken along line VIII-VIII of FIG. 9.
Figure 9:
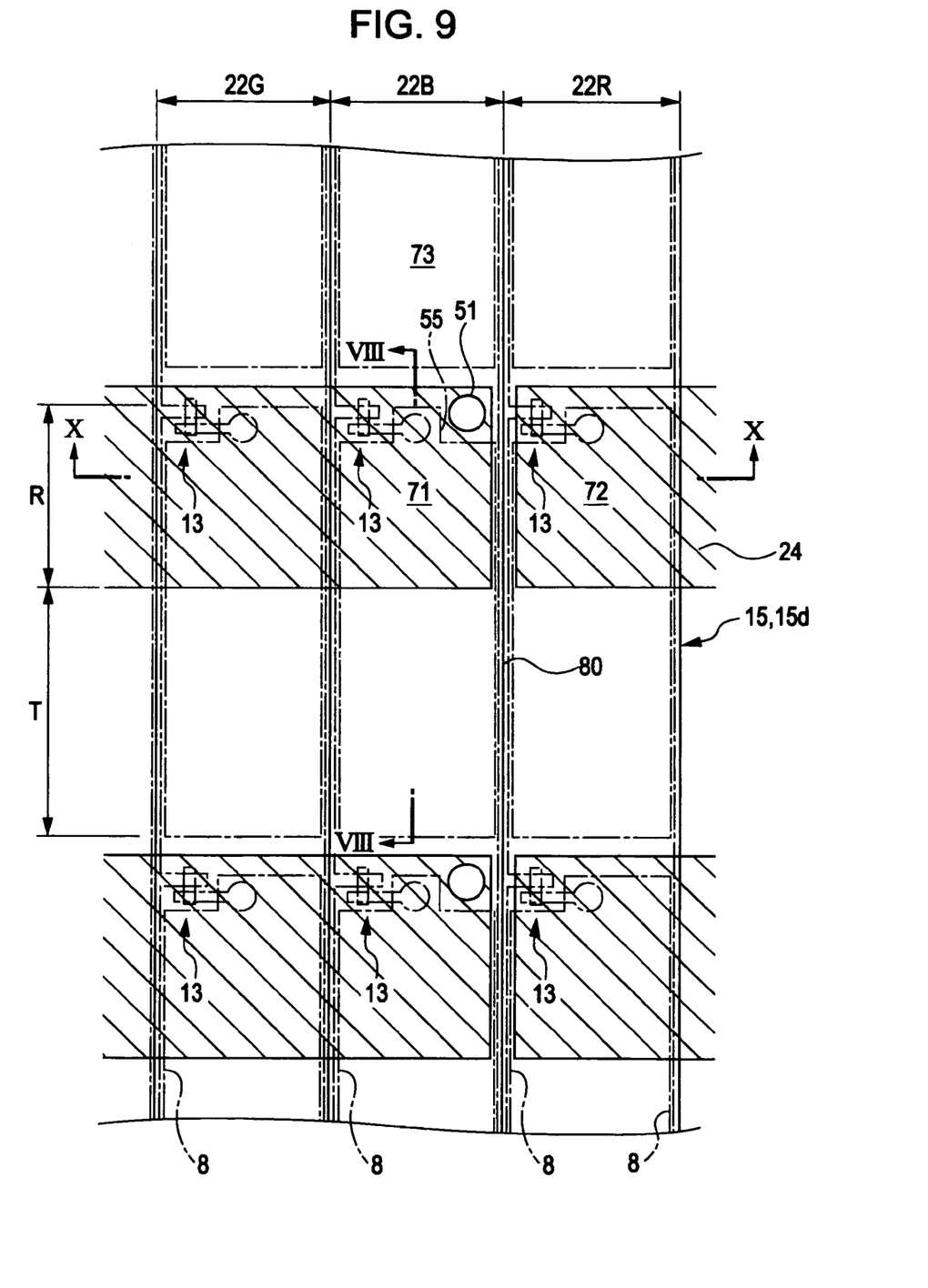
FIG. 9 is a plan view of a CF substrate.

FIG. 8 is a side cross-sectional view of a sub pixel region taken along line VIII-VIII of FIG. 9. In FIG. 8, for facilitating understanding, the TFD elements and various kinds of wirings on the element substrate 10 will be omitted.

As shown in FIG. 8, a resin layer 26 having irregularities thereon is formed on one end of the sub pixel region at the inner side of the CF substrate 20 and a reflective layer 27 is formed on the surface of the resin layer 26. A region in which the reflective layer 27 is formed becomes a reflection region R and a region in which the reflective layer 27 is not formed becomes a transmission region T. The above-described CF layer 22 is formed to cover the reflective layer 27.

A liquid crystal layer thickness adjusting layer 24 for reducing the thickness of the liquid crystal layer 50 in the reflection region R to less than that of the liquid crystal layer 50 in the transmission region T is formed on the surface of the CF layer 22. The above-described opposite electrodes 25 are formed at the inner side of the CF substrate 20 on which the liquid crystal layer thickness adjusting layer 24 is formed.

An alignment layer 29 made of polyimide is formed on the surface of the opposite electrodes 25. The alignment layer 29 is formed by drying a soluble polyimide solution, which is, for example, coated by a flexographic printing method, at 180° C. or less. Similarly, an alignment layer 19 is formed on the surface of the pixel electrodes 15 of the element substrate 10.

In order to restrict the thickness (cell gap) of the liquid crystal layer 50, a photo spacer 51 is formed. The photo spacer 51 is erected on the surface of the liquid crystal layer thickness adjusting layer 24 of the CF substrate 20 such that the front end thereof is in contact with the element substrate 10. Alternatively, the photo spacer 51 may be erected on the element substrate 10 such that the front end thereof is in contact with the CF substrate 20. Even in any case, since the photo spacer 51 is formed in the reflection region R in which the thickness of the liquid crystal layer is reduced by the liquid crystal layer thickness adjusting layer 24, it is possible to reduce an aspect ratio of the photo spacer 51. The photo spacer 51 is made of a photosensitive material such as acrylic resin and is formed using the photolithography.

The liquid crystal layer 50 made of the positive type liquid crystal material having the positive dielectric anisotropy is interposed between the element substrate 10 and the CF substrate 20 shown in FIG. 8. This liquid crystal material is aligned in parallel to the alignment layer when applying the non-selection voltage and is aligned perpendicular to the alignment layer (that is, parallel to an electric field direction) when applying the selection voltage. The liquid crystal device according to the present embodiment operates in an electrically-controlled birefringence (ECB) mode or a twisted nematic mode. Even in any case, white display is performed when applying the non-selection voltage and black display is performed when applying the selection voltage (normally white mode).

Groove

FIG. 9 is a plan view of the CF substrate. In FIG. 9, the pixel electrode 15 formed on the element substrate is denoted by a dashed line. The second embodiment is different from the first embodiment in that a groove 80 of the liquid crystal layer thickness adjusting layer 24 is formed such that first regions in which the thickness of the liquid crystal layer is large and which are disposed at the both sides of the Y direction across the liquid crystal layer thickness adjusting layer 24 are communicated with each other, and the photo spacer 51 is formed adjacent to the groove 80.

In the second embodiment, the reflection region R is provided at one end of each sub pixel region 15d and the liquid crystal layer thickness adjusting layer 24 is provided in correspondence with the reflection region R. The liquid crystal layer thickness adjusting layer 24 is continuously formed in the X direction to cross the plurality of sub pixel regions 15d. The groove 80 is formed in the liquid crystal layer thickness adjusting layer 24 in the boundary between the first color filter 22B and the second color filter 22R. The groove 80 is formed from the first region in which the thickness of the liquid crystal layer is large to a second region in which the thickness of the liquid crystal layer is small such that the first regions disposed at the both sides of the Y direction across the liquid crystal layer thickness adjusting layer 24 are communicated with each other.

Figure 10:
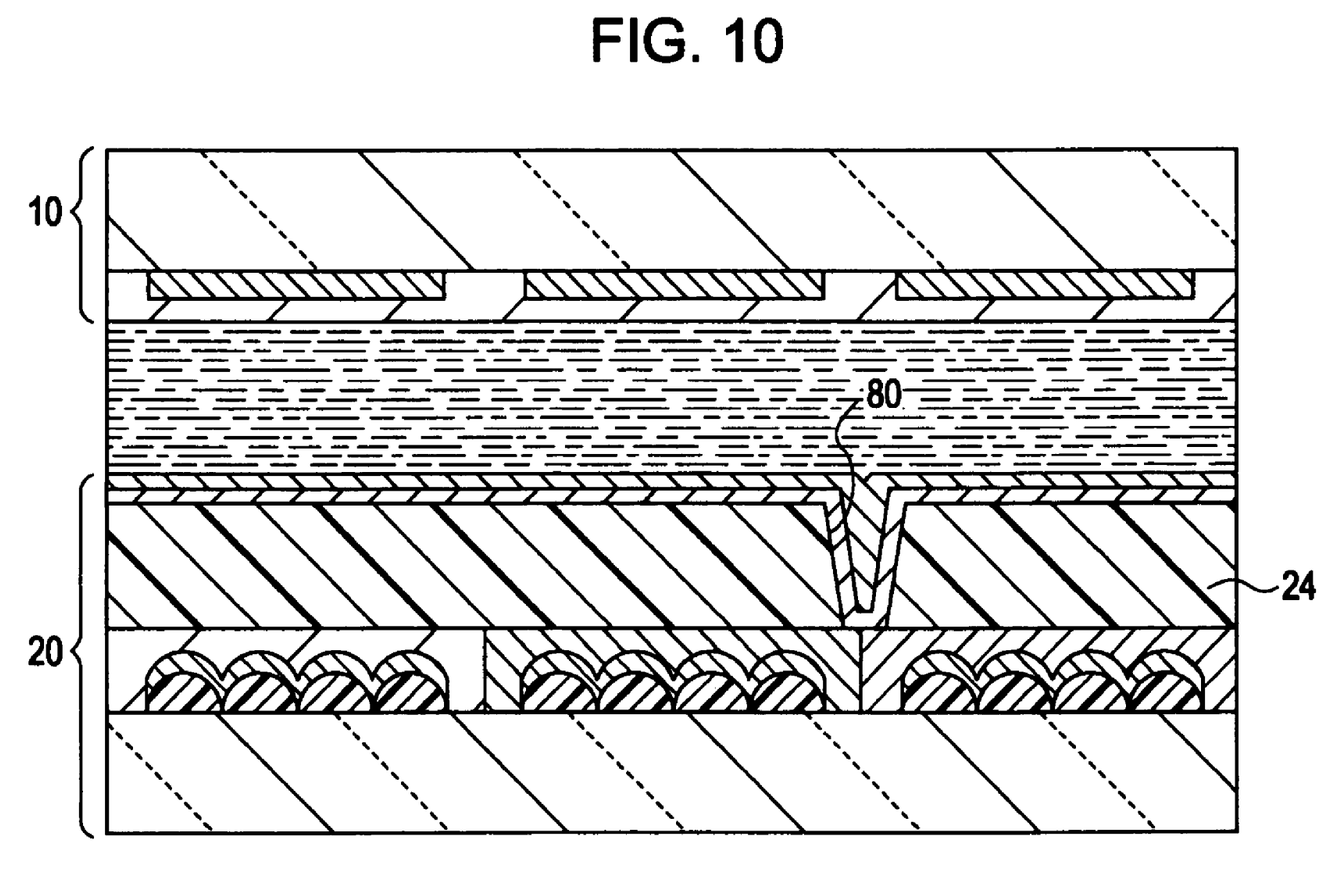
FIG. 10 is a front cross-sectional view taken along line X-X of FIG. 9.

FIG. 10 is a front cross-sectional view taken along line X-X of FIG. 9. The groove 80 shown in FIG. 10 is formed to penetrate through the liquid crystal layer thickness adjusting layer 24 in the thickness direction. That is, the bottom of the groove 80 is disposed at a height which is substantially equal to that of the surface of the first region of the CF substrate 20 having the liquid crystal layer thickness adjusting layer 24 thereon. The groove 80 may be shallowly formed such that the liquid layer thickness adjusting layer 24 remains at the bottom of the groove 80.

As shown in FIG. 9, even in the second embodiment, since the groove 80 is formed in the liquid crystal layer thickness adjusting layer 24 from the first region to the second region, it is possible to allow the material liquid of the alignment layer coated on the transmission region T to escape into the groove. Particularly, in the second embodiment, since the first regions are communicated with each other by the groove 80, the amount of the material liquid of the alignment layer which is coated in the transmission region T becomes uniform. Accordingly, it is possible to suppress the liquid pool of the alignment layer in the edge of the transmission region T.

In the second embodiment, the photo spacer 51 is disposed adjacent to the groove 80. More specifically, a notch 55 is formed in a corner of the pixel electrode 15 adjacent to the groove 80 and the photo spacer 51 is erected on the surface of the liquid crystal layer thickness adjusting layer 24 in correspondence with a region in which the notch 55 is formed. Accordingly, it is possible to reduce possibility that the disturbance in the alignment which occurs in vicinity of the photo spacer 51 extends to the central portion of the sub pixel region and to minimize influence of light leakage due to the disturbance in the alignment.

Even in the second embodiment, the groove 80 and the photo spacer 51 are formed only in the boundary between the color filters which transmit color light having lowest visibility. More specifically, the groove 80 is formed only in the boundary between the color filter 22B which transmits the blue light and the color filers 22R which transmits the red light. It is preferable that the photo spacer 51 is formed adjacent to the groove 80 in a region in which the first color filter 22B is formed. Accordingly, although the disturbance in the alignment occurs in the vicinities of the groove 80 and the photo spacer 51, since the green light having high visibility does not leak and the blue light having low visibility leaks, it is possible to minimize influence of the light leakage. When a light shielding layer is formed in the boundary between the color filters which transmit different color lights and the region in which the photo spacer is formed, it is possible to more suppress the influence of the light leakage. Alternatively, the photo spacer 51 may be formed at a portion adjacent to the groove 80 in a region in which the second color filter 22R is formed.

As described above, according to the liquid crystal device of the second embodiment, since the liquid pool of the alignment layer can be suppressed, the thickness of the alignment layer can become uniform and irregularities are prevented from being generated. Since it is possible to minimize the influence of the light leakage due to the disturbance in the alignment which occurs in the groove 80 and the photo spacer 51, it is possible to ensure display quality. Accordingly, it is possible to suppress the liquid pool of the alignment layer and to ensure the display quality.

Electronic Apparatus

Figure 11:
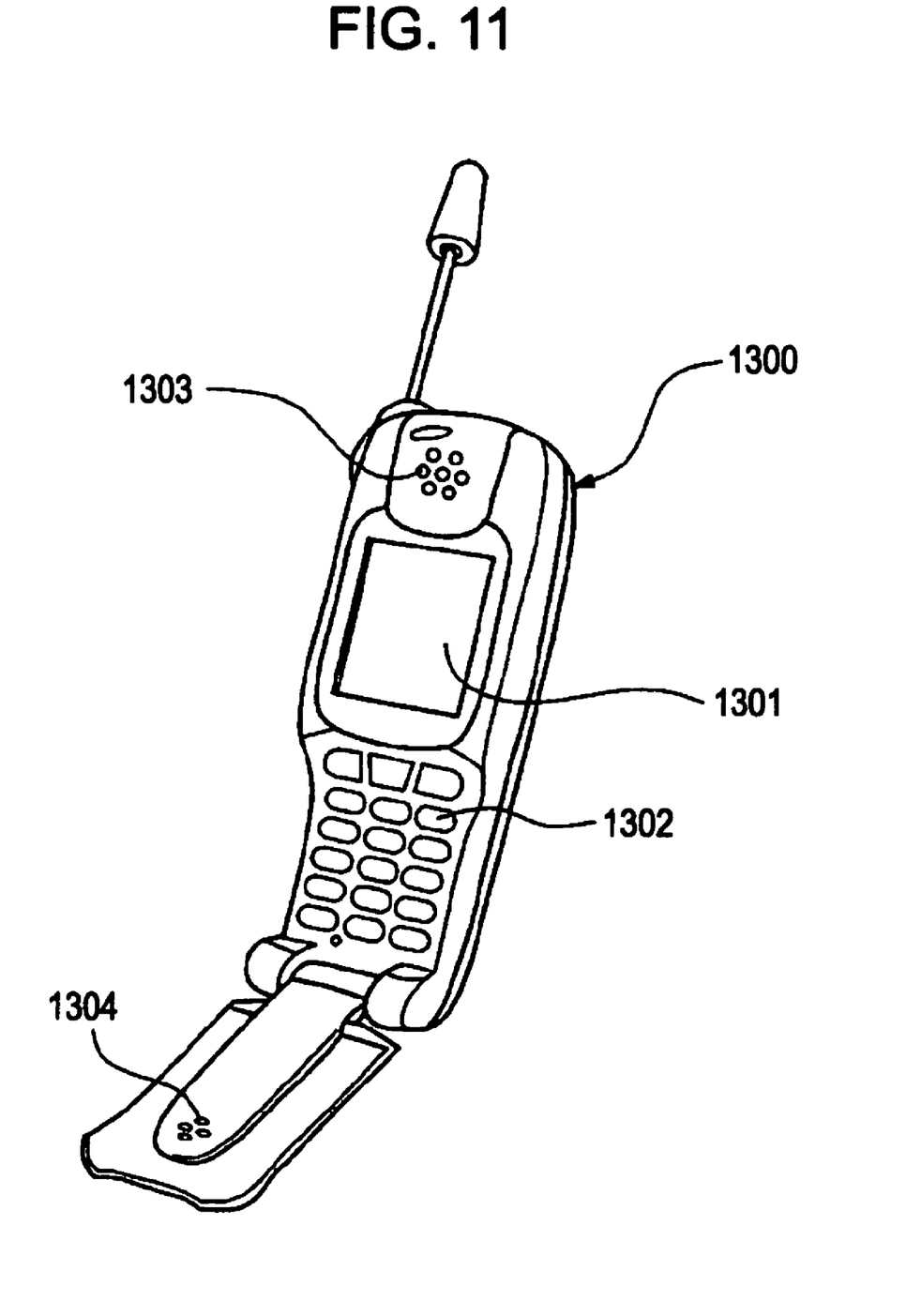
FIG. 11 is a perspective view of a mobile telephone.

FIG. 11 is a perspective view of an electronic apparatus according to an embodiment of the invention. A mobile phone 1300 shown in FIG. 11 includes a display device according to the embodiment of the invention as a small-sized display unit 1301. The mobile phone 1300 further includes a plurality of manipulation buttons 1302, an ear piece 1303 and a mouth piece 1304. Since the liquid crystal device according to the embodiment of the invention can suppress the liquid pool of the alignment layer and ensure display quality, it is possible to provide the mobile phone 1300 having excellent display quality.

The display devices according to the embodiments of the invention are not limited to the mobile phone and can be suitably used as an image display unit such as an electronic notebook, a personal computer, a digital still camera, a liquid crystal display television set, a videotape recorder of the viewfinder type or monitor type, a car navigation device, a pager, a electronic picket notebook, an electronic calculator, a word processor, a workstation, a television phone, a POS terminal, and other devices having touch panels. Even in any electronic apparatus, bright display having high contrast is possible.

The technical range of the invention is not limited to the above-described embodiments and may be embodied in several forms without departing from the spirit of the invention. The materials and configurations of the embodiments are only exemplary and may be adequately changed.

The entire disclosure of Japanese Patent Application No: 2005-269658, filed Sep. 16, 2005 is expressly incorporated by reference herein.

What is claimed is:

1. A liquid crystal device comprising:
   a pair of substrates;
   a liquid crystal layer interposed between the pair of substrates;
   a first region and a second region, a thickness of the liquid crystal layer being smaller in the second region than that in the first region;
   a plurality of sub pixels, each of the sub pixels having a transmission region formed in the first region and a reflection region formed in the second region, the transmission regions of the plurality of sub pixels arranged side-by-side, and the reflections regions of the plurality of sub pixels arranged side-by-side;
   a plurality of color filters including a first color filter, a second color filter and a third color filter, the first, the second and the third color filters corresponding to each of the sub pixels, respectively; and
   a liquid crystal layer thickness adjusting layer placed at least in the second region, the liquid crystal layer thickness adjusting layer having a groove formed at a boundary between sub pixels corresponding to the first color filter and the second color filter, the liquid crystal layer thickness adjusting layer not having a groove and continuously formed between sub pixels corresponding to the second and the third color filters,
   wherein a light transmitted by the first color filter has lower visibility than lights transmitted by the second and the third color filters and a light transmitted by the third color filter has higher visibility than lights transmitted the first and the second color filters.

2. A liquid crystal device according to claim 1, wherein the plurality of color filters includes a color filter that transmits a blue light, a color filter that transmits a red light, and a color filter that transmits a green light, and wherein the first color filter transmits the blue light, the second color filter transmits the red light and the third color filter transmits the green light.

3. A liquid crystal device according to claim 1, wherein one of the pair of substrates has the plurality of color filters, and the other of the pair of substrates has the liquid crystal layer thickness adjusting layer.

4. The liquid crystal device according to claim 1, the device further comprising
   a spacer which holds a gap between the pair of substrates, wherein the spacer is disposed in a region of the first color filter.

* * * * *